US008977913B2

(12) United States Patent
Liang et al.

(10) Patent No.: US 8,977,913 B2
(45) Date of Patent: Mar. 10, 2015

(54) METHOD, DEVICE AND BASEBAND CHIP FOR RECEIVING SERVICE DATA IN A COMMUNICATION SYSTEM

(71) Applicant: Spreadtrum Communications (Shanghai) Co., Ltd., Shanghai (CN)

(72) Inventors: Jingxin Liang, Shanghai (CN); Yu Dong, Shanghai (CN)

(73) Assignee: Spreadtrum Communications, Shanghai (CN)

( * ) Notice: Subject to any disclaimer, the term of this patent is extended or adjusted under 35 U.S.C. 154(b) by 306 days.

(21) Appl. No.: 13/731,370

(22) Filed: Dec. 31, 2012

(65) Prior Publication Data

US 2014/0189447 A1 Jul. 3, 2014

(51) Int. Cl.
*G01R 31/28* (2006.01)
*H04W 76/02* (2009.01)

(52) U.S. Cl.
CPC ................... *H04W 76/027* (2013.01)
USPC .......................... 714/712; 714/752

(58) Field of Classification Search
CPC  H04W 76/027; G06F 11/1036; H03M 13/05; H03M 13/29
USPC .......... 370/347, 516; 714/808, 755, 752, 776, 714/712
See application file for complete search history.

(56) References Cited

U.S. PATENT DOCUMENTS

| 4,691,319 | A * | 9/1987 | Bose et al. ................. 714/808 |
| 5,546,409 | A * | 8/1996 | Karasawa .................. 714/755 |
| 8,572,452 | B2 * | 10/2013 | Wang et al. ................ 714/752 |
| 2002/0144207 | A1 * | 10/2002 | Shih et al. ................. 714/776 |
| 2005/0249184 | A1 * | 11/2005 | Kumaki .................... 370/347 |
| 2007/0165678 | A1 * | 7/2007 | Huertgen et al. ........... 370/516 |
| 2010/0303016 | A1 | 12/2010 | Jin et al. |

FOREIGN PATENT DOCUMENTS

| CN | 101237241 A | 8/2008 |
| CN | 102130747 A | 7/2011 |

OTHER PUBLICATIONS

Office Action dated Jan. 30, 2014 in Chinese Patent Application No. 201110419357, with English language notification sheet, 10 pages.
English Abstract of Chinese Patent Application No. 200710063433, publication No. CN101237241, 1 page, Last updated: Nov. 12, 2013.
English Abstract of Chinese Patent Application No. 201110110177, publication No. CN102130747, 1 page, Last updated: Nov. 12, 2013.

* cited by examiner

*Primary Examiner* — David Ton
(74) *Attorney, Agent, or Firm* — Vierra Magen Marcus LLP

(57) ABSTRACT

The present disclosure provides a method, a device and a baseband chip for receiving service data in a communication system. The method includes: receiving service data including a plurality of data blocks, where each of the plurality of data blocks comprises an information code and a check code; performing a first check and a second check on the service data; and outputting a predetermined number of information codes which pass the first check and are performed with a second check computation of the second check. The present disclosure saves memory space of the baseband chip.

20 Claims, 3 Drawing Sheets

METHOD, DEVICE AND BASEBAND CHIP FOR RECEIVING SERVICE DATA IN A COMMUNICATION SYSTEM

FIELD OF THE DISCLOSURE

The present disclosure generally relates to mobile communication technology, and more particularly, to a method, a device and a baseband chip for receiving service data in a communication system.

BACKGROUND

Long Term Evolution (LTE) is an evolution of the Third Generation Mobile Communication (3G). It improves and enhances the radio interface technologies of 3G, and uses Orthogonal Frequency Division Multiplexing (OFDM) and Multiple-Input Multiple-Output (MIMO) as sole standard of its wireless network evolution. LTE can provide 150 Mbit/s peak rate of uplink and 300 Mbit/s peak rate of downlink in 20 MHZ spectral bandwidth. Meanwhile, LTE improves performances to cell-edge users, increases cell capacity and decreases system delay. Compared with 3G, LTE has advantages of high communication rate and spectrum efficiency, low wireless network delay, continuous area coverage and downward compatibility. However, the implementation of LTE requires a high-level design for User Equipment (UE) terminal, such as high baseband chip's ability to process the service data in a terminal and as little as possible memory space taken in the baseband chip.

In LTE system, service data transmitted from a base station to a UE is organized in form of Transport Block (TB) and Code Block (CB). FIG. 1 illustrates a schematic data structure diagram of service data. The base station sends a TB information code and generally processes the TB information code as follows: firstly, forming a TB data by adding a TB check code at the end of the TB information code; segmenting the TB data, namely, dividing the TB data into n CB information codes; performing a CRC relative operation on each CB information code, i.e. forming CB data (such as CB Data1, CB Data2, etc.) by adding a CB check code at the end of each CB information code; and concatenating the CB data in turn to form the service data transmitted from the base station to the UE. In other words, to ensure an accurate transmission of the service data between the base station and the UE, each of the CB data includes an independent CRC (Cyclic Redundancy Check) check word (i.e. CB check code) and the whole TB data has a CRC check word (i.e. TB check code) as well. Therefore, through a CRC check, it can be determined whether the service data is received successfully or not. If the reception fails, the UE may instruct the base station to resend the data.

A conventional method for receiving service data in a baseband chip in a UE is described as follows:

Step S1, receiving and storing one decoded CB data from a decoder and performing a CRC check on the decoded CB data;

Step S2, if the decoded CB data passes the CRC check, concatenating in sequence CB information codes in the CB data which successfully pass the CRC check and storing the same in a buffer of the baseband chip; if the amount of CB information codes is not enough for one individual TB data, proceeding to Step S1; otherwise, proceeding to Step S4;

Step S3, if the decoded CB data fails the CRC check, displaying that reception of the TB data fails and closing the process; and Step S4, performing a CRC check on the TB data, if passing the CRC check, outputting the TB information code in the TB data to a memory outside the baseband chip for invoking by an upper layer protocol; if failing the CRC check, displaying that the reception of the TB data fails and closing the process.

According to the conventional baseband chip processing procedure, it is necessary to reserve memory space for a whole TB data in the buffer of the baseband chip, which occupies a lot of chip memories.

More relative information may refer to US patent publication NO. US2010303016A1 entitled "System and Method for Transport Block Size Design for Multiple-Input, Multiple-Output (MIMO) in a Wireless Communications System", however, which still leaves aforementioned problems unsolved.

SUMMARY

The present disclosure provides a method to save memory space of a baseband chip when a UE processes service data sent from a base station.

Embodiments of the present disclosure provide a method for receiving service data in a communication system, including: receiving service data including a plurality of data blocks, where each of the plurality of data blocks includes an information code and a check code; performing a first check and a second check on the service data; and outputting a predetermined number of information codes which pass the first check and are performed with a second check computation of the second check.

Optionally, each of the plurality of data blocks is a Code Block (CB) data including a CB information code and a CB check code, where performing the first check and the second check on the service data includes: performing the first check on the CB data and performing the second check computation on a CB information code in the CB data.

Optionally, outputting the predetermined number of information codes which pass the first check and are performed with the second check computation may include: outputting the predetermined number of CB information codes which pass the first check and are performed with the second check computation.

Optionally, after outputting the predetermined number of information codes which pass the first check and are performed with the second check computation, the method further may include: not stopping check until there is one CB data failing the first check, or all the CB data passes the first check and the CB information codes of the service data are performed with the second check computation; determining successful in reception of the service data if the CB information codes of the service data pass the second check; and determining failing in reception of the service data if there is one CB data failing the first check or the CB information codes of the service data fail the second check. In some embodiments, the CB information codes of the service data include information code of each CB data, i.e. all information codes of all CB data in the service data.

Optionally, performing a second check computation on the CB information code in the CB data may include: performing the second check computation on the first CB information code in queue directly, and performing the second check computation on subsequent CB information codes in queue with a remainder of a previous CB information code after a second check computation. In some embodiments, performing the second check computation on subsequent CB information code in queue with a remainder of a previous CB information code after a second check computation means performing a second check computation on a check data resulted from a concatenation of a CB information code to be checked, other than the first one in queue (i.e. from a second one in queue), with a remainder of a previous CB information code after a second check computation.

Optionally, the communication system may be a LTE system.

Optionally, the predetermined number may be less than the number of the multiple data blocks.

Optionally, if the CB information codes of the service data pass the second check, all the output CB information codes of the service data are concatenated in sequence to form one Transport Block (TB) data, wherein the TB data may include a TB information code and a TB check code.

Optionally, both the first check and the second check may include a CRC check, a parity check, a MD5 check or a block check character (bcc) check.

Optionally, the first check is a CB CRC check and the second check is a TB CRC check.

Embodiments of the present disclosure further provide a device for receiving service data in a communication system, including: a reception unit configured to receive service data including a plurality of data blocks, where each of the plurality of data blocks includes an information code and a check code; a check unit configured to perform a first check and a second check computation on the service data received by the reception unit; and an output unit configured to output a predetermined number of information codes which pass the first check and are performed with a second check computation of the second check.

Embodiments of the present disclosure further provide a baseband chip including the above reception device.

Compared with the existing methods, the present disclosure has the following advantages.

A UE receives service data including multiple data blocks, wherein each of the multiple data blocks includes an information code and a check code. A baseband chip may perform a first check and a second check on the service data and then output a predetermined number of information codes which pass the first check and are performed with a second check computation of the second check. Both the first check and the second check may be performed on the received service data, and the predetermined number of information codes which pass the first check and are performed with the second check computation of the second check may be output outside the baseband chip, which thereby saves buffer space of the baseband chip used.

In some embodiments, each of the multiple data blocks may be a CB data. A predetermined number of CB data is stored in the baseband chip, where the first check is performed on the stored CB data and the second check is performed on CB information codes in the CB data. If the CB data passes the first check and the CB information codes in the CB data are performed with the second check computation, the predetermined number of CB information codes may be output until all the CB data passes the first check and the CB information codes of the service data are performed with the second check computation. If there is one CB data failing the first check or the CB information codes of the service data fail the second check, the reception of the service data fails, wherein the first check may be a CB CRC check and the second check may be a TB CRC check.

In some embodiments, the predetermined number may be less than the number of CB information codes in one TB data, such as 1 to 3. Therefore, when a UE receives service data sent from a base station, a buffer inside the baseband chip only needs to store a part of the CB data, it may be not necessary to reserve memory space for a whole TB data, which thereby saves memory space of the baseband chip used.

DETAILED DESCRIPTION OF THE DISCLOSURE

According to the conventional method of receiving service data sent from a base station, a baseband chip in a UE needs to store a whole TB data in a buffer, which may occupy a lot of chip memory. A method and a baseband chip for receiving service data in a communication system is provided in this disclosure. According to the method, only a part of the CB data needs to be stored in the buffer of the baseband chip, it may be not necessary to reserve memory space for the whole TB data when the UE receives service data sent from the base station, which may save memory space of the baseband chip.

In order to clarify the objects, characteristics and advantages of the disclosure, embodiments of present disclosure will be described in detail in conjunction with accompanying drawings.

Figure 1:
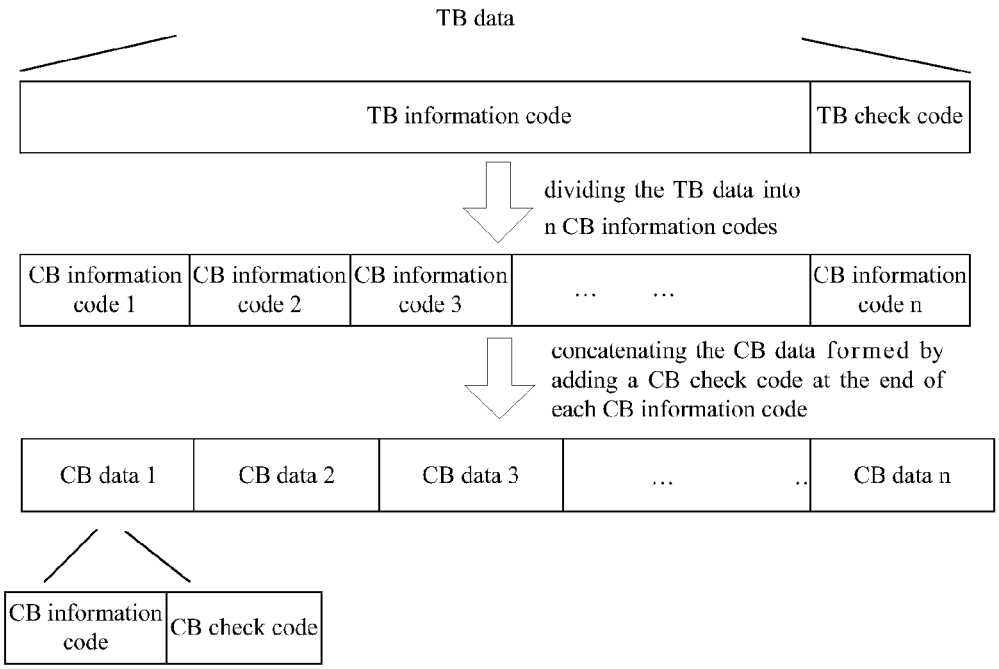
FIG. 1 illustrates a schematic data structure diagram of service data.
Figure 2:
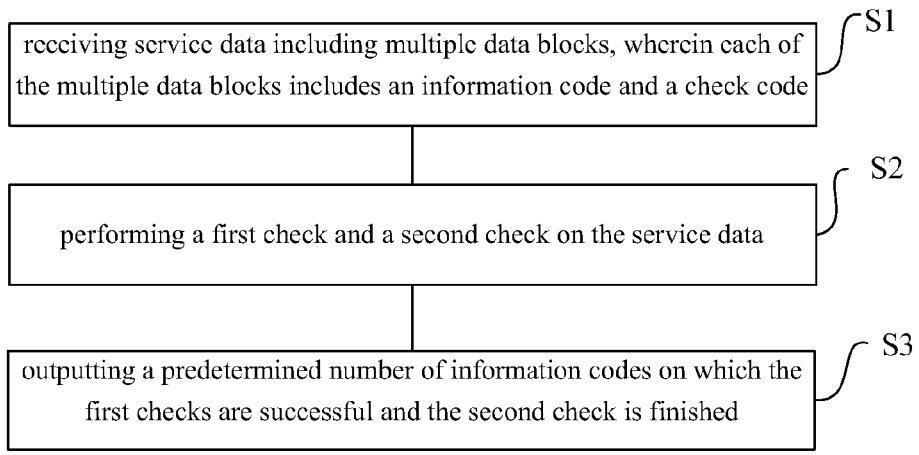
FIG. 2 illustrates a schematic flow chart of a method for receiving service data in a communication system according to one embodiment of the present disclosure.

FIG. 2 illustrates a schematic flow chart of a method for receiving service data in a communication system in the present disclosure. Referring to FIG. 1, the method may include:

Step S1: receiving service data including a plurality of data blocks, where each of the plurality of data blocks includes an information code and a check code;

Step S2: performing a first check and a second check on the service data; and

Step S3: outputting a predetermined number of information codes which pass the first check and are performed with a second check computation of the second check.

Embodiments of the method for receiving service data in a communication system in FIG. 2 will be described in detail in conjunction with a baseband chip for receiving service data shown in FIG. 3.

It is should be noted that in the following embodiments, the first check is a CB CRC check and the second check is a TB CRC check. It is known to those skilled in the art that a CRC code is generally utilized to check the decoded CB data and TB data. A CRC check is taken for example in the embodiments, which should not unduly limit the scope of the disclosure. A Parity Check, a MD5 Check, a bcc check and the like may also be utilized. It should be noted that the second check mainly includes two processes: a second check computation and a second check determination. Hereinafter, unless otherwise stated, the TB CRC check in the disclosure means a second check computation.

Step S1: receiving service data including a plurality of data blocks, where each of the plurality of data blocks includes an information code and a check code.

In some embodiments, the communication system may be a LTE system, for example, a TD-LTE system (LTE system in Frequency Division mode) or a FDD-LTE system (LTE system in Frequency Division Duplexing mode). The TD-LTE system is taken for example hereinafter. A UE receives service data sent from a base station. The service data may include multiple data blocks, wherein each of the multiple data blocks may include an information code and a check code. Specifically, on the physical layer of the TD-LTE system, each of the multiple data blocks may be a CB data including a CB information code and a CB check code.

Generally, the service data from the base station to the UE may be sent in TB by sending out OFDM (Orthogonal Frequency Division Multiplexing) symbols through radio frequency. The OFDM symbols may be analog waves formed by signal processing (such as Fast Fourier Transform Inverse, Parallel-to-Serial conversion, inserting a Cyclic Prefix and Digital Analog Conversion) on several original data bits at a sending terminal (i.e. base station). Correspondingly, a baseband chip 1 in the UE may receive service data in TB and perform a signal processing procedure (such as removing the CP, Serial-to-Parallel conversion, Fast Fourier Transform and Analog Digital Conversion) opposite to the sending terminal.

Furthermore, before sending the service data, the base station may send schedule information to the UE. The schedule information may include: a modulation mode and a MIMO mode (such as space diversity, transmit diversity) applied to the sent sub-data frame (the service data being sent in form of data frame and each data frame includes multiple sub-data frames); an encoding rate and a length of one CB data or one TB data, etc. Correspondingly, the baseband chip 1 in the UE may concatenate CB information codes in the several received CB data to form the TB data according to the schedule information.

Step S2: performing a first check and a second check on the service data.

In some embodiments, after receiving the service data, a first check may be performed on the CB data and a second check may be performed on the CB information code in the CB data. It should be noted that the second check mainly includes two processes: a second check computation and a second check determination.

Firstly, a decoder 11 of the baseband chip 1 may perform a MIMO decoding, a descrambling, a de-rate matching and a Forward Error Correction (FFC) decoding on the CB data respectively. The MIMO decoding may be performed in parallel on multiple CB data respectively using multiple processors. Descrambling and de-rate matching may also operate in parallel. Then the FEC decoding on the CB data may be performed using another processor array. The decoded CB data may be output and stored in a buffer 12 of the baseband chip 1.

Afterwards, a CB checker 13 may perform a CB CRC check on each of the multiple CB data respectively. It is known to those skilled in the art that each CB data sent from the base station generally includes a k-bit information code and an r-bit check code, wherein the information code and the check code may be binary numbers. The check code may be a CRC code in general.

Specifically, a method of the CB CRC check on the CB data may include:

Firstly, dividing the CB data by a CB generated code to obtain a remainder. The CB generated code may be an (r+1)-bit binary number. And an r-bit check code may be created based on the CB generated code at the sending terminal, which may include: shifting the k-bit CB information code in the CB data to the left by r bits and performing zero-padding on the r bits of the right blank positions; dividing the CB information code (k+r bits) which experience the left shift of r bits and the zero-padding by the CB generated code to obtain the remainder, i.e. the r-bit check code; and concatenating the r-bit check code to the end of the k-bit information code to form the CB data to be transmitted, wherein the CB data may include a k-bit CB information code and an r-bit CB check code. In some embodiments, the decimal number corresponding to the CB generated code may be a prime number. The reason may be that a false-positive rate of the CB CRC check may be raised if the decimal number corresponding to the CB generated code is a composite number. Because the composite number may include multiple divisors, for example, 16 is a composite number which includes divisors of 1, 2, 4, 8, 16, etc. Assuming that the decimal number corresponding to the CB generated code is a composite number, when a CB CRC check is performed on the CB data, if the CB data can be divided by the binary number (the CB generated code) corresponding to the composite number, the CB data can also be divided by all the divisors of the composite number. Accordingly, the false-positive rate of the CB CRC check may be raised. However, a prime number is indivisible by other natural numbers except 1 and itself. Therefore, taking a binary number corresponding to a prime number as a CB generated code may raise the accuracy of a CB CRC check on one CB data.

At the receiving terminal, a CRC check may be performed on the received CB data using the CB generated code and whether the received CB data is correct or not may be determined according to the remainder. The determination process may include: if the remainder is zero, the CB data may pass the CB check; otherwise, the CB data fails the CB check. Furthermore, a CB CRC check may be performed on the CB data one by one according to the method of the CB CRC check on CB data described above. Once there is one CB data failing a CB CRC check, reception of the service data fails.

Compared with the existing methods, besides a CB CRC check on CB data, a TB CRC check may also need to be performed on CB information codes in a predetermined number of CB data by a TB checker 14 in the baseband chip 1. In some embodiments, the predetermined number may be defined by a size of the buffer 12 in the baseband chip 1. The disclosure aims to save memory space of the buffer in the baseband chip, so the predetermined number may be less than the number of the multiple data blocks. For example, the predetermined number may be 1 to 3 (namely, memory space of the buffer being 0.768 Kbyte to 2.304 Kbyte), which should not unduly limit the scope of the disclosure. It should be noted that the predetermined number is less than the total number of CB information codes in one TB data.

In some embodiments, each of the CB data may include a CB information code and a CB check code. The TB data may include a TB information code and a TB check code, which is equivalent to a concatenation of CB information codes in multiple CB data. Assuming that each of the CB data includes a k-bit CB information code and an r-bit CB check code, the TB data may include a M-bit TB information code and a N-bit TB check code. Since CB information codes in all the CB data may be concatenated in sequence to form the TB data (e.g., the number of the CB data is S), M+N may be equal to S*K.

Hereinafter, a TB CRC check on CB information codes in CB data will be described in detail by taking one CB data for instance.

For example, one CB data is stored in the buffer 12 of the baseband chip 1, and the CB data is already performed with a CB CRC check. A method of a TB CRC check on the CB information code in the CB data may include: inputting the CB information code in the CB data to the TB checker 14 for a TB CRC check; performing the TB CRC check on the CB information code in the CB data; and proceeding to Step S3 after the CB information code in the CB data is performed with the TB CRC check and outputting the CB information code in the CB data.

It should be noted that, different from the above CB CRC check performed on the CB data, the TB CRC check on the CB information code in the CB data may include dividing the CB information code by a TB generated code to get a remainder "a". Since the current TB CRC check is the first TB CRC check on CB information code in the CB data, there is no remainder obtained by the previous TB CRC check in TB checker 14. It should be noted that, before the whole TB data (i.e. the TB data including all the CB information codes) is input into the TB checker 14 entirely, whether the TB CRC check is correct or not is not determined, that is, the second check determination may not be performed on the CB information codes of the TB data unless the whole TB data including all the CB information codes is performed with the second check computation. The formation of the TB generated code may refer to the formation of the CB generated code, which is not described in detail herein.

Afterwards, the buffer 12 in baseband chip 1 may store a next CB data which is already performed with a CB CRC check. Then, the CB information code in the next CB data may be input into the TB checker 14 for a TB CRC check. It should be noted, the CB information code input into the TB checker 14 may be concatenated to the end of the remainder "a" of the previous CB information code after a TB CRC check to get a check data, namely, which is the remainder "a" with the current CB information code behind. Then, a TB CRC check may be performed on the check data to obtain a remainder "b".

The TB CRC check on CB information codes may be performed according to the above method until the last CB data of the service data is stored in the buffer 12 of the baseband chip 1 and the last CB data is already performed with a CB CRC check. Then, the CB information code in the last CB data may be input to the TB checker 14 to perform a TB CRC check and obtain the final remainder of the TB CRC check on the whole TB data. If the final remainder is zero, the service data may be received successfully; otherwise, the reception of the service data fails.

The above embodiments relate to perform a TB CRC check on a CB information code in one CB data. If the predetermined number of the CB data is 2 or 3, those skilled in the art may refer to the above embodiments and make appropriate changes. The method of performing a TB CRC check on CB information codes in two or three CB data is not elucidated in detail.

Step S3: outputting a predetermined number of information codes which pass the first check and are performed with a second check computation of the second check.

Step S3 may include: outputting CB information codes in a predetermined number of CB data which pass the first check and are performed with a second check computation of the second check. In some embodiments, Step S3 may be performed according to the size of the buffer 12 in the baseband chip 1. Specifically, if the buffer 12 in the baseband chip 1 can store only one CB data, the predetermined number may be one. Therefore, when the one CB data passes a CB CRC check and its information code is performed with a TB CRC check, the CB information code in the one CB data may be output to an external memory 2 outside the baseband chip 1. If the buffer 12 in the baseband chip 1 can store two CB data, the predetermined number may be two. Therefore, when the two CB data passes a CB CRC check and is performed with a TB CRC check, CB information codes in the two CB data may be output to the external memory 2 outside the baseband chip 1, and so on.

In some embodiments, CB information codes in a predetermined number of CB data may be output from the buffer 12 in the baseband chip 1 to the external memory 2 outside the baseband chip 1 through a DMA (Direct Memory Access) controller 15. The DMA technology is known to those skilled in the art and is not described in detail.

After Step S3, the method may further include: not stopping check until there is one CB data failing the first check, or all the CB data passes the first check and the CB information codes of the service data are performed with the second check computation. The CB information codes of the service data include information code of each CB data, i.e. all information codes of all CB data in the service data.

Figure 4:
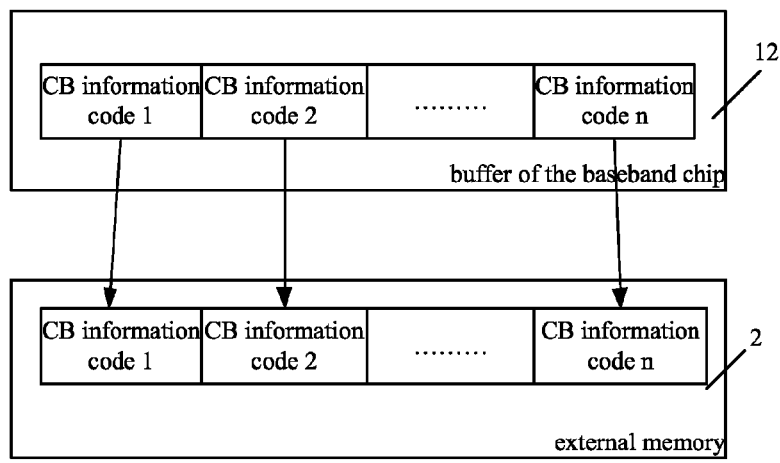
FIG. 4 illustrates a schematic diagram of a relationship between a buffer of a baseband chip and an external memory in this disclosure.

FIG. 4 illustrates a schematic diagram of a relationship between a buffer of a baseband chip and an external memory according to one embodiment of the disclosure. Referring to FIG. 4, after the buffer 12 receives a CB information code (e.g., CB information code 1) which passes the first check (CB CRC check), a second check computation (TB CRC check) may be performed on the CB information code and then the same may be output to the external memory 2. Therefore, memory space of the buffer 12 may be used to store a next CB information code since there is a copy of the CB information code 1 stored in the buffer in the external memory 2, which may save buffer space in the baseband chip. It is known to those skilled in the art that cost of a buffer (buffer memory) in a baseband chip is generally higher than that of an external memory (off-chip memory). Therefore, the cost of manufacturing a baseband chip in a UE may be reduced by saving buffer space in the baseband chip.

It should be noted, FIG. 4 illustrates a situation that the buffer 12 only stores one CB information code (since the CB data is performed with a CRC check, the CB check code in the CB data may be discarded). In practice, the buffer 12 may also store 1 to 3 CB information codes according to embodiments of the disclosure, which is not described in detail.

According to the processing result of Step S3, if the CB information codes of the service data pass the second check, the reception of the service data is successful. All the CB information codes may be output to be concatenated in sequence to form a TB data, wherein the TB data may include a TB information code and a TB check code. Then an upper layer protocol may invoke the TB data in the external memory 2. If there is one CB data failing the first check or the CB information codes of the service data fail the second check (namely, the determination result of the second check is failed), the reception of the service data fails. And the UE may discard all the CB information codes in CB data belonging to the TB data, wherein the CB information codes have been sent into the external memory 2.

Figure 5:
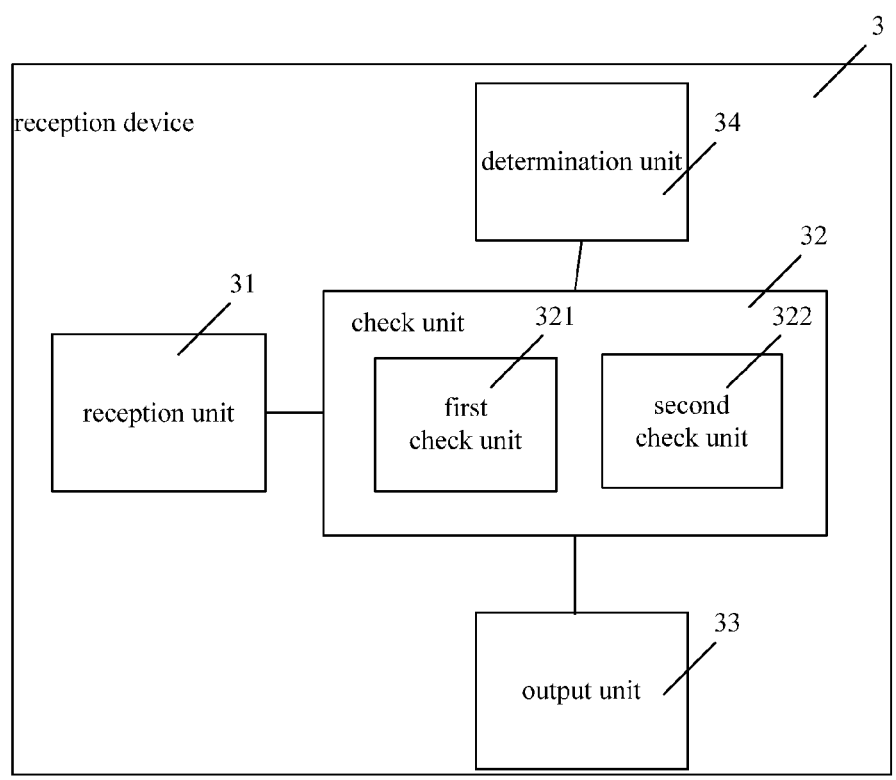
FIG. 5 illustrates a schematic structure diagram of a device for receiving service data in a communication system according to one embodiment of the present disclosure.

Embodiments of the present disclosure further provide a device for receiving service data in a communication system based on the above method for receiving service data in a communication system. FIG. 5 illustrates a schematic structure diagram of a device for receiving service data in a communication system according to one embodiment of the present disclosure. In some embodiments, the communication system may be a TD-LTE system. Referring to FIG. 5, the reception device may include a reception unit 31, a check unit 32, an output unit 33 and a determining unit 34.

The reception unit 31 is configured to receive service data. The service data may include multiple data blocks, each of the multiple data blocks including an information code and a check code. The check unit 32 is configured to perform a first check and a second check computation of a second check on the service data received by the reception unit 31. The output unit 33 is configured to output a predetermined number of information codes which pass the first check and are performed with a second check computation. It should be noted that the second check mainly includes two processes: a second check computation and a second check determination.

In some embodiments, the reception device 3 may be located in a baseband chip inside a mobile terminal (i.e. UE). The reception device 3 is configured to process the service data sent from a base station to a UE. The service data may include multiple CB data, wherein each of the multiple CB data may include a CB information code and a CB check code.

In some embodiments, the reception device 3 may further include a buffer (not shown) which is interconnected to the reception unit 31. The buffer is configured to store a predetermined number of CB data among the service data, wherein the predetermined number may depend on a size of the buffer. For example, if the size of the buffer is 0.768 Kbyte to 2.304 Kbyte, the predetermined number of CB data may be 1 to 3 correspondingly.

The check unit 32 is configured to perform the first check on the CB data and perform the second check computation on the CB information codes in the CB data. In some embodiments, the check unit 32 may include a first check unit 321 and a second check unit 322. According to various check methods, both the first check unit 321 and the second check unit 322 may include a CRC check unit, a parity check unit, a MD5 check or a bcc check unit.

In some embodiments, the CRC check may be utilized. Referring to FIG. 5, the first check unit 321 is configured to perform the first check on the CB data and the second check unit 322 is configured to perform the second check computation on the CB information codes in the CB data. In some embodiments, the first check unit 321 may be a CB CRC check unit and the second check unit 322 may be a TB CRC check unit. Furthermore, the check unit 32 may not stop check until there is one CB data failing the first check, or all the CB data passes the first check and the CB information codes of the service data are performed with the second check computation.

Specifically, the check method of the first check unit 321 may include: performing a CB CRC check on the CB data to obtain a remainder; if the remainder is zero, the CB data passes the CB CRC check; otherwise, the CB data fails the CB CRC check. The check method of the second check unit 322 may include performing a TB CRC check on the CB information code in the CB data. It should be noted, performing a TB CRC check on a CB information code in a CB data may include: performing a TB CRC check on a CB information code first in queue, or performing a TB CRC check on a check data resulted from a concatenation of a CB information code to be checked, other than the first one in queue, with a remainder of a previous CB information code after a TB CRC check.

Furthermore, before the whole TB data (all the CB information codes belonging to the TB data) is input into the second check unit 322 entirely, whether the TB CRC check is correct or not is not determined, that is, the second check determination may not be performed on the CB information codes of the TB data unless the whole TB data including all the CB information codes is performed with the second check computation. When the last CB information code in the TB data is input to the second check unit 322, a TB CRC check may be performed on the last CB information code and a final remainder of the TB CRC check on the whole TB data may be obtained. If the remainder is zero, the reception of the service data may be successful; otherwise, the reception of the service data fails.

Furthermore, CB information codes in the predetermined number of the CB data, which pass the CB CRC check and are performed with the TB CRC check in the check unit 32, may be output by the output unit 33. In some embodiments, the predetermined number of the CB data may be output to a memory (not shown) outside the baseband chip by DMA.

The determining unit 34 may determine whether the TB CRC check is correct or not according to the check results of the check unit 32. If the CB information codes of the service data pass the TB CRC check, the reception of the service data is successful; if there is one CB data failing the CB CRC check, or the CB information codes of the service data fail the TB CRC check, the reception of the service data fails.

Embodiments of the present disclosure further provide a baseband chip. Referring to FIG. 4, the baseband chip may include a device for receiving service data in a communication system. The reception device is configured to implement the above method for receiving service data in a communication system. The method which may refer to some embodiments of the above method is not described in detail.

Figure 3:
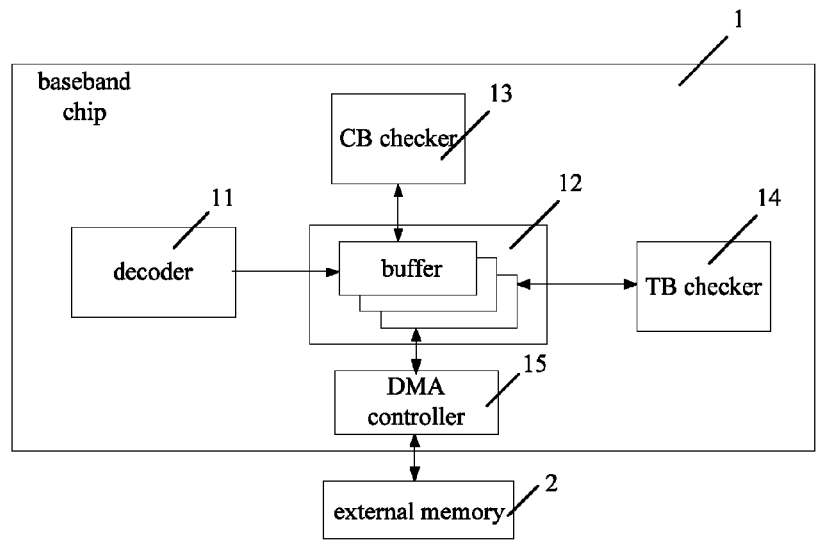
FIG. 3 illustrates a schematic diagram of a baseband chip receiving service data according to one embodiment of the present disclosure.

In practice, referring to FIG. 3, the baseband chip may include a decoder 11, a buffer 12, a CB checker 13, a TB checker 14 and a DMA controller 15.

The decoder 11 corresponding to the reception unit 31 shown in FIG. 5 is configured to receive TB data sent from the base station, decode the TB data and send the decoded TB data to the buffer 12. The CB checker 13 may correspond to the CB CRC check unit 321. The TB checker 14 may be corresponding to the TB CRC check unit 322 and the DMA controller 15 may correspond to the output unit 33 in FIG. 5.

In conclusion, in the present disclosure, a UE may receive service data including multiple data blocks, wherein each of the multiple data blocks may include an information code and a check code. In a baseband chip, a first check and a second check may be performed on the service data, and the predetermined number of information codes which pass the first check and are performed with the second check computation may be output, which thereby may save buffer space of the baseband chip used.

In some embodiments, each of the multiple data blocks may be a CB data. A predetermined number of CB data may be saved in a baseband chip. A first check may be performed on the predetermined number of CB data respectively and a second check may be performed on CB information codes in the predetermined number of CB data. If the predetermined number of CB data passes the first check and its information codes are performed with the second check computation, the predetermined number of CB data may be output until all the CB data is performed with the first check and CB information codes in the service data are performed with the second check. If there is one CB data failing the first check, or the CB information codes of the service data fail the second check, the reception of the service data fails.

In some embodiments, the predetermined number may be less than the number of CB information codes in one TB data, such as 1 to 3. Therefore, when the UE receives service data sent from the base station, only a part of the CB data needs to be stored in the buffer of the baseband chip, it may be not necessary to reserve memory space for the whole TB data when the UE receives service data sent from the base station, which may save memory space of the baseband chip.

Although the present disclosure has been disclosed as above with reference to preferred embodiments thereof but will not be limited thereto. Those skilled in the art can modify and vary the embodiments without departing from the spirit and scope of the present disclosure. Accordingly, without departing from the scope of the present invented technology scheme, whatever simple modification and equivalent variation belong to the protection range of the present invented technology scheme.

What is claimed is:

1. A method for receiving service data in a communication system, comprising:
   receiving service data comprising a plurality of data blocks, where each of the plurality of data blocks comprises an information code and a check code;
   performing a first check and a second check on the service data; and
   outputting a predetermined number of information codes which pass the first check and are performed with a second check computation of the second check.

2. The method for receiving service data in a communication system according to claim 1, where each of the plurality of data blocks is a Code Block (CB) data comprising a CB information code and a CB check code, where performing the first check and the second check on the service data comprises:
   performing the first check on the CB data and performing the second check computation on a CB information code in the CB data.

3. The method for receiving service data in a communication system according to claim 2, where outputting the predetermined number of information codes which pass the first check and are performed with the second check computation comprises:
   outputting the predetermined number of CB information codes which pass the first check and are performed with the second check computation.

4. The method for receiving service data in a communication system according to claim 2, where after outputting the predetermined number of information codes which pass the first check and are performed with the second check computation, the method further comprises:
   not stopping check until there is one CB data failing the first check, or all the CB data passes the first check and the CB information codes of the service data are performed with the second check computation;
   determining successful in reception of the service data if the CB information codes of the service data pass the second check; and
   determining failing in reception of the service data if there is one CB data failing the first check or the CB information codes of the service data fail the second check.

5. The method for receiving service data in a communication system according to claim 4, where performing a second check computation on the CB information code in the CB data comprises: performing the second check computation on the first CB information code in queue directly, and performing the second check computation on subsequent CB information codes in queue with a remainder of a previous CB information code after a second check computation.

6. The method for receiving service data in a communication system according to claim 2, where if the CB information codes of the service data pass the second check, all the output CB information codes of the service data are concatenated in sequence to form one Transport Block (TB) data, wherein the TB data comprises a TB information code and a TB check code.

7. The method for receiving service data in a communication system according to claim 1, where the predetermined number is less than the number of the plurality of data blocks.

8. The method for receiving service data in a communication system according to claim 1, where the first check is a CB CRC check and the second check is a TB CRC check.

9. A device for receiving service data in a communication system, comprising:
   a reception unit configured to receive service data comprising a plurality of data blocks, where each of the plurality of data blocks comprises an information code and a check code;
   a check unit configured to perform a first check and a second check computation of a second check on the service data received by the reception unit; and
   an output unit configured to output a predetermined number of information codes which pass the first check and are performed with a second check computation.

10. The device for receiving service data in a communication system according to claim 9, where each of the plurality of data blocks is a CB data comprising a CB information code and a CB check code; where the check unit is configured to perform the first check on the CB data and to perform the second check computation on the CB information codes in the CB data.

11. The device for receiving service data in a communication system according to claim 10, where the output unit is configured to output the CB information codes of the predetermined number of CB data which pass the first check and are performed with the second check.

12. The device for receiving service data in a communication system according to claim 10, where the check unit does not stop check until there is one CB data failing the first check, or all the CB data passes the first check and the CB information codes of the service data are performed with the second check computation.

13. The device for receiving service data in a communication system according to claim 10 further comprising: a determining unit configured to determine whether or not the reception is successful according to check results of the check unit, where if the CB information codes of the service data pass the second check, the reception of the service data is successful; if there is one CB data failing the first check, or the CB information codes of the service data fail the second check, the reception of the service data fails.

14. The device for receiving service data in a communication system according to claim 13, where the check unit performing a second check computation on the CB information code in the CB data comprises: performing the second check computation on the first CB information code in queue directly, and performing the second check computation on subsequent CB information codes in queue with a remainder of a previous CB information code after a second check computation.

15. The device for receiving service data in a communication system according to claim 9, where the predetermined number is less than the number of the plurality of data blocks.

16. The device for receiving service data in a communication system according to claim 10, where the check unit comprises a first check unit and a second check unit, wherein the first check unit is configured to perform the first check on the CB data and the second check unit is configured to perform the second check computation on the CB information codes in the CB data.

17. The device for receiving service data in a communication system according to claim 16, where the first check unit is a CB CRC check unit and the second check unit is a TB CRC check unit.

18. A baseband chip comprising a device for receiving service data in a communication system, where the device comprises:
- a reception unit configured to receive service data comprising a plurality of data blocks, where each of the plurality of data blocks comprises an information code and a check code;
- a check unit configured to perform a first check and a second check computation of a second check on the service data received by the reception unit; and
- an output unit configured to output a predetermined number of information codes which pass the first check and are performed with a second check computation.

19. The baseband chip according to claim 18, where each of the plurality of data blocks is a CB data comprising a CB information code and a CB check code; where the check unit is configured to perform the first check on the CB data and to perform the second check computation on the CB information codes in the CB data.

20. The baseband chip according to claim 18, further comprising: a determining unit configured to determine whether or not the reception is successful according to check results of the check unit, where if the CB information codes of the service data pass the second check, the reception of the service data is successful; if there is one CB data failing the first check, or the CB information codes of the service data fail the second check, the reception of the service data fails.

\* \* \* \* \*

UNITED STATES PATENT AND TRADEMARK OFFICE
CERTIFICATE OF CORRECTION

| | | |
|---|---|---|
| PATENT NO. | : 8,977,913 B2 | Page 1 of 1 |
| APPLICATION NO. | : 13/731370 | |
| DATED | : March 10, 2015 | |
| INVENTOR(S) | : Liang et al. | |

It is certified that error appears in the above-identified patent and that said Letters Patent is hereby corrected as shown below:

Title page

Item (73) ASSIGNEE please change "SPREADTRUM COMMUNICATIONS" to "Spreadtrum Communications (Shanghai) Co., Ltd."

Signed and Sealed this
Twentieth Day of October, 2015

Michelle K. Lee
*Director of the United States Patent and Trademark Office*